Figures 1, 2:
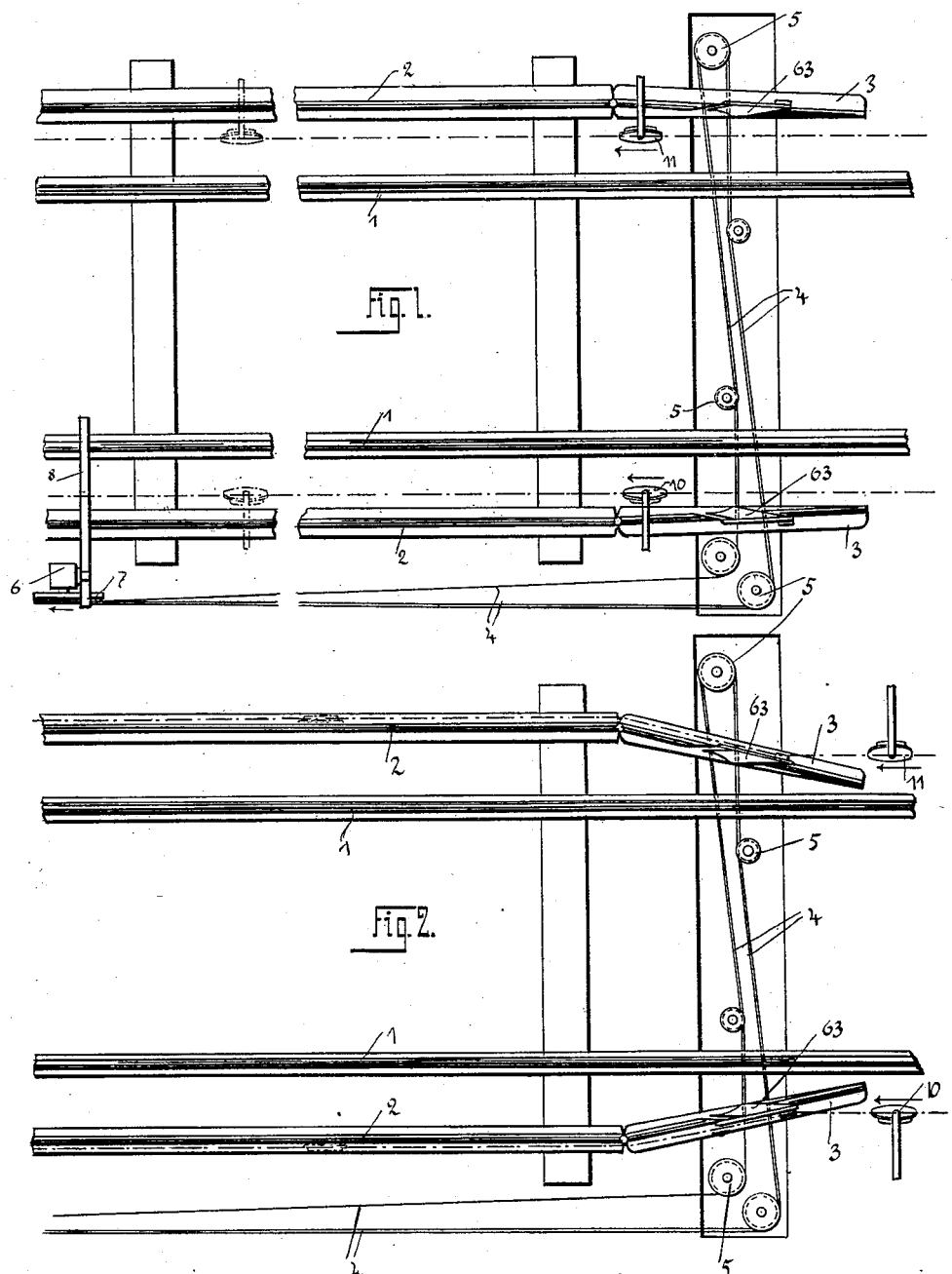

No. 749,111. PATENTED JAN. 5, 1904.
H. STADELMANN, Jr.
APPARATUS FOR SIGNALING ON LOCOMOTIVES.
APPLICATION FILED FEB. 21, 1903.
NO MODEL. 6 SHEETS—SHEET 1.

Witnesses: Inventor: Hermann Stadelmann Jr.

No. 749,111. PATENTED JAN. 5, 1904.
H. STADELMANN, Jr.
APPARATUS FOR SIGNALING ON LOCOMOTIVES.
APPLICATION FILED FEB. 21, 1903.
NO MODEL. 6 SHEETS—SHEET 2.
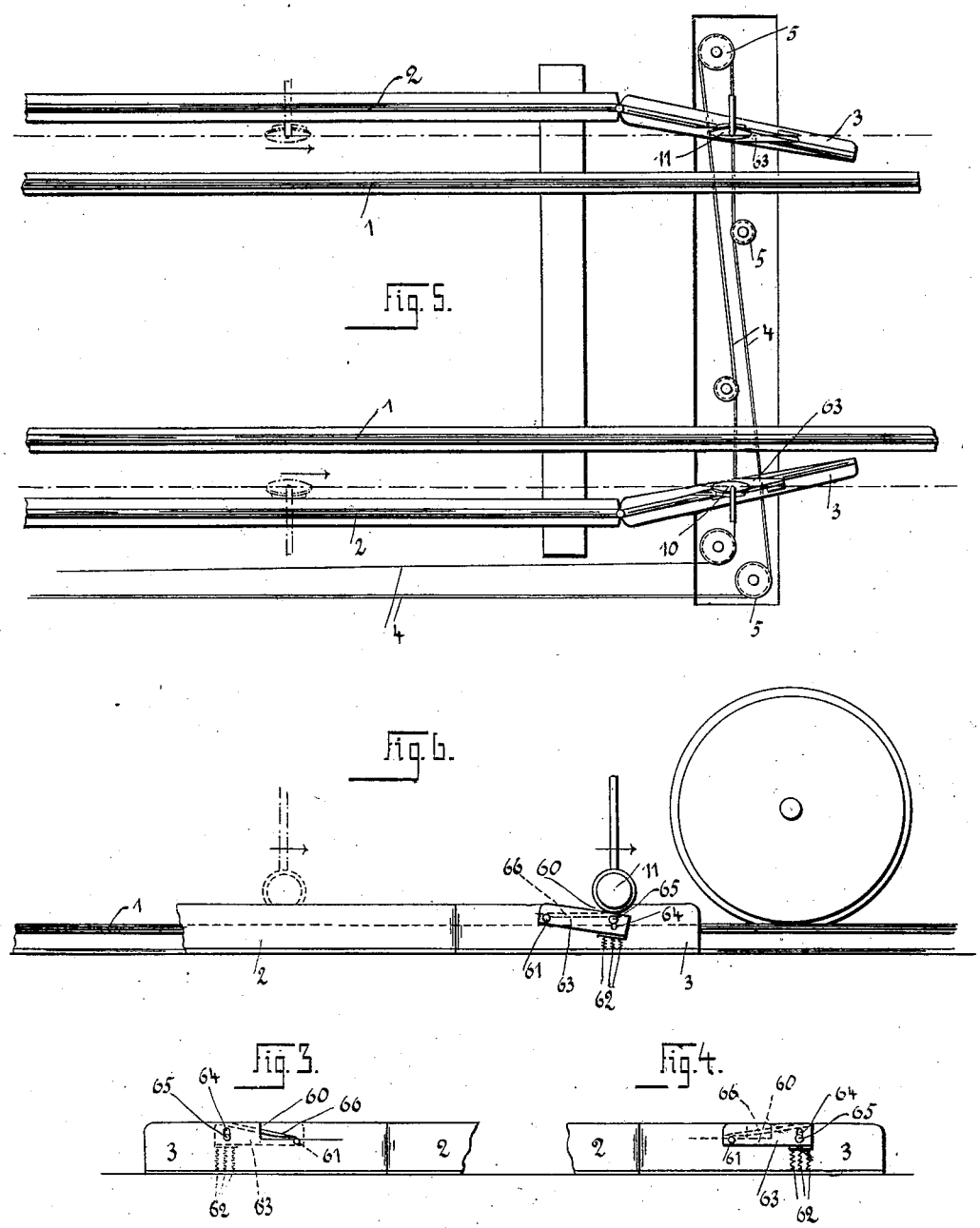

No. 749,111. PATENTED JAN. 5, 1904.
H. STADELMANN, Jr.
APPARATUS FOR SIGNALING ON LOCOMOTIVES.
APPLICATION FILED FEB. 21, 1903.
NO MODEL. 6 SHEETS—SHEET 3.
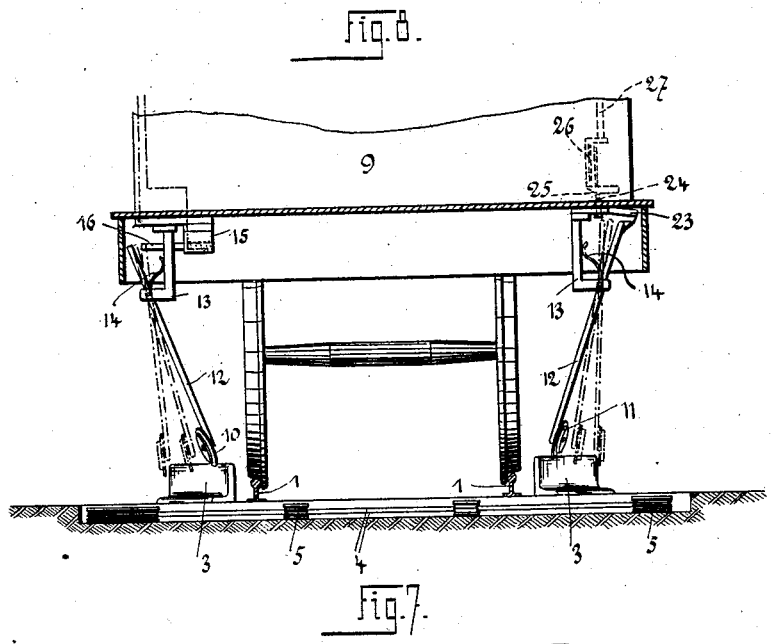
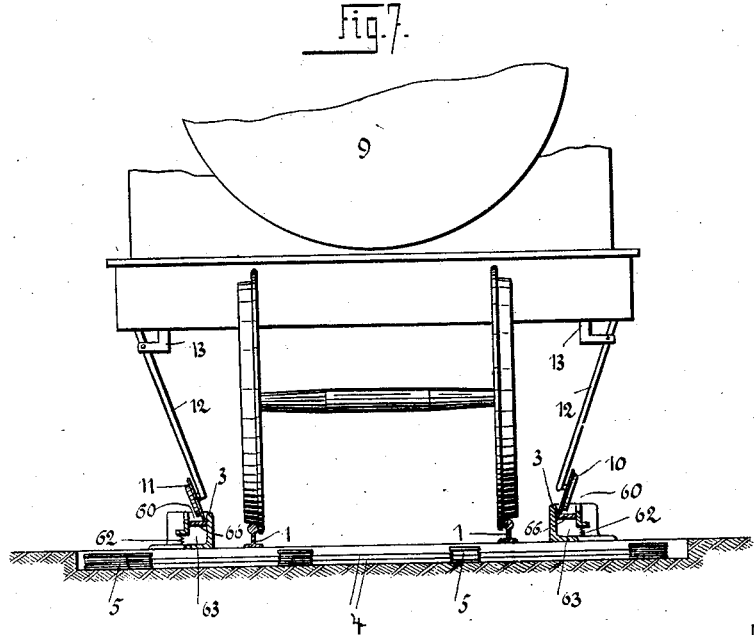
Witnesses:
Inventor:
Hermann Stadelmann Jr.
by Knight Bros
Attys No. 749,111. PATENTED JAN. 5, 1904.
H. STADELMANN, Jr.
APPARATUS FOR SIGNALING ON LOCOMOTIVES.
APPLICATION FILED FEB. 21, 1903.
NO MODEL. 6 SHEETS—SHEET 4.
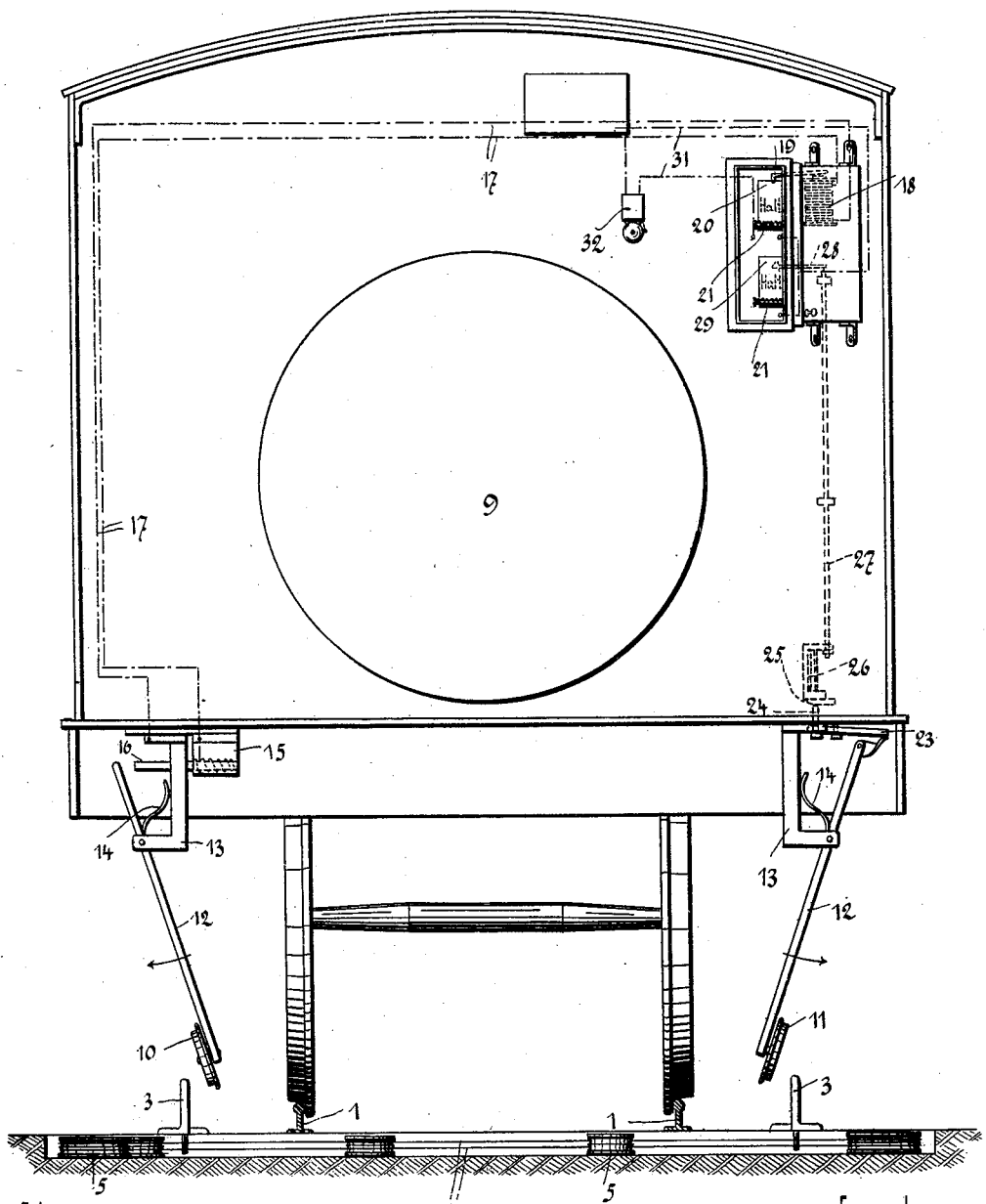

No. 749,111. PATENTED JAN. 5, 1904.
H. STADELMANN, Jr.
APPARATUS FOR SIGNALING ON LOCOMOTIVES.
APPLICATION FILED FEB. 21, 1903.
NO MODEL. 6 SHEETS—SHEET 5.
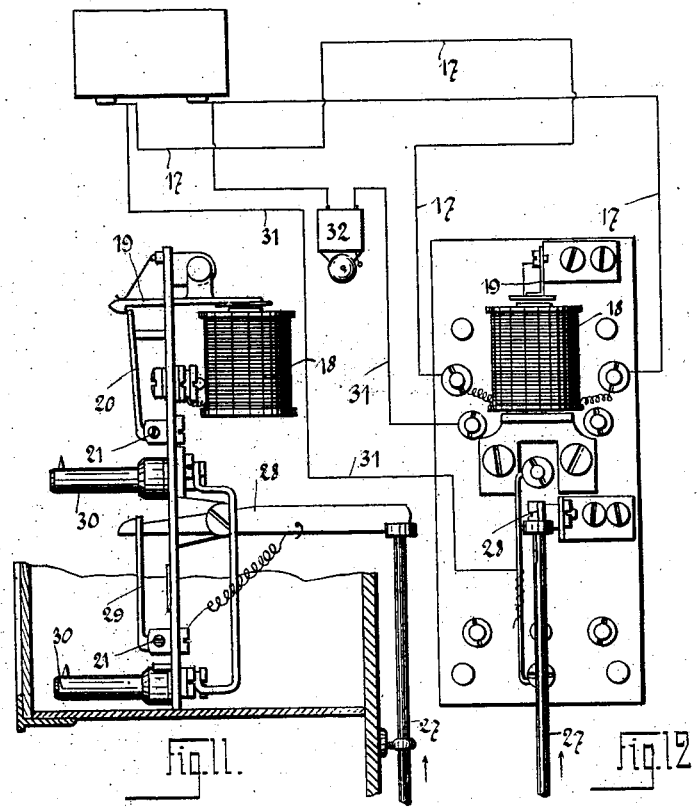
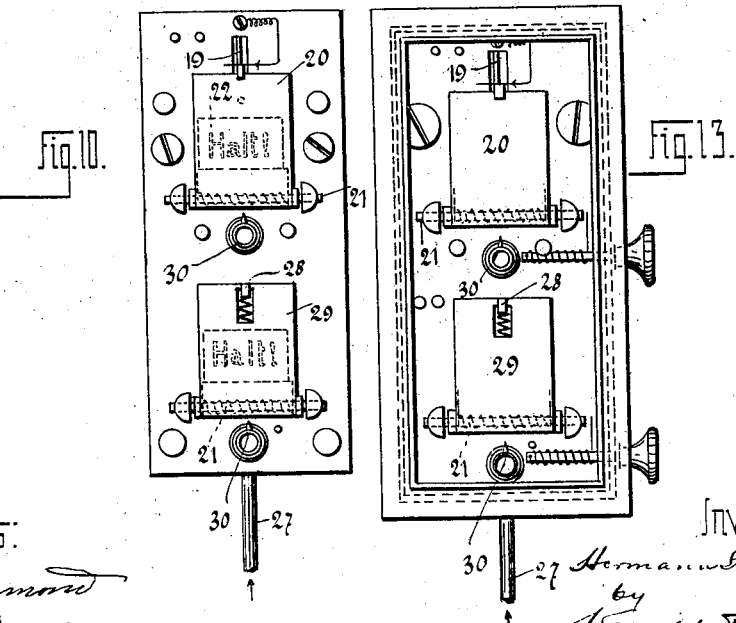

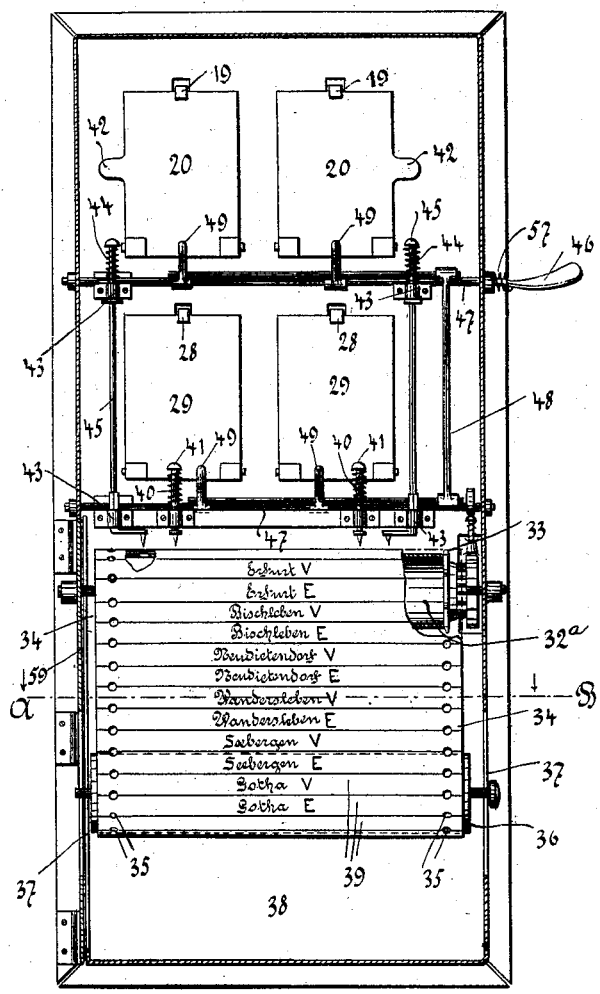

No. 749,111. Patented January 5, 1904.

UNITED STATES PATENT OFFICE.

HERMANN STADELMANN, JR., OF APOLDA, GERMANY, ASSIGNOR OF ONE-HALF TO LOUIS DREYFUS, OF FRANKFORT-ON-THE-MAIN, PRUSSIA, GERMANY.

APPARATUS FOR SIGNALING ON LOCOMOTIVES.

SPECIFICATION forming part of Letters Patent No. 749,111, dated January 5, 1904.

Application filed February 21, 1903. Serial No. 144,472. (No model.)

*To all whom it may concern:*

Be it known that I, HERMANN STADELMANN, Jr., a subject of the Emperor of Germany, residing at 34 Jagerstrasse, Apolda, in the Grand Duchy of Saxe-Weimar and Kingdom of Prussia, Empire of Germany, have invented certain new and useful Improvements in Apparatus for Signaling on Locomotives, of which the following is a specification.

The present invention has for its object to provide an apparatus for giving the engine driver an indication when at a certain distance from the station or before reaching a block-section as to whether the signal is at "danger" or "safety"—*i. e.*, whether the line ahead is clear or not.

The invention relates especially to such devices of the before-named kind in which separate section-stops provided with suitable tongues, like a switch, are arranged close to the lines outside the track, said tongues being connected to the distance-signal and actuated simultaneously with the same and on "stop" or on "clear" the stops or tongues, in conjunction with suitable gear mounted on the locomotive, actuating a signal which is visible and at the same time audible on the locomotive.

The device hereinafter described has, as compared with the former means of the same kind, several important features or advantages. First, the section-stops are arranged in duplicate on both sides of the track, and the gears of the locomotive are arranged in the same manner. Further, the said gears are so arranged that they slide outwardly along the sides of the section-stops, but do not run upon the same. By this arrangement of the section-stops and gears I effect, on the one hand, that the signal apparatus on the locomotive is actuated in any event, even when the device on one side of its own accord or on account of the oscillations of the locomotive does not work, and on the other hand I hereby perfectly prevent any injury or breaking off of the gears of the locomotive, a frequent occurrence in gears which run upon the section-stop.

The sure action of the device is further increased by the fact that the actuating of the double locomotive-signal is effected from the section-stop on the one side by mechanical connection and from the section-stop on the other side by electric connection and that the actuating of the visible flap-signal effects simultaneously the actuating of an audible signal and that, furthermore, each signal given on the locomotive is registered. Thus any danger of the overlooking of the distance-signal by the locomotive driver is almost excluded.

Finally, the device is so constructed that it may be used on double as well as single lines, as the movable tongues of the section-stops actuate the locomotive-signal but in one direction, while in the other direction they in some measure shunt—*i. e.*, give free way to them—so that in the latter direction of motion the locomotive-signal is not actuated.

In the accompanying drawings, Figure 1 is a plan view of part of the permanent way with open section-stops. Fig. 2 is the same view with closed section-stops. Fig. 3 shows in elevation the movable tongue of the section-stop from the inside. Fig. 4 is the same view from the outside. Fig. 5 is the same view as Fig. 2 and shows the passage of the gears of the engine through the closed section-stop in the direction in which the locomotive-signal is not to be actuated. Fig. 6 shows the same in a side view, and Fig. 7 the same in a view from the front of the engine. Fig. 8 is a view of the closed section-stop from the back of the engine. Fig. 9 is the same view with open tongues, at the same time illustrating the arrangement of the signal device on the locomotive and the connections of the same with the gears. Figs. 10 to 13 are detail views of the flap-signal device of the locomotive. Fig. 14 shows a modification of the signal apparatus in connection with a recording device in front view with the casing open. Fig. 15 is a longitudinal section of the apparatus shown in Fig. 14; and Fig. 16, a cross-section of the same on the line A B, Fig. 14.

Close to the side of the rail length 1, Fig. 1, and outside the same so-called "contact-rails" 2, with movable tongues 3, are arranged, said rails being about ten to fifteen centimeters higher than the track-rails and about ten meters long or longer. The tongues 3 are so coupled together by means of wire ropes 4 that they are simultaneously moved away from or toward the rails 1. These wire ropes are led, for example, over horizontal sheaves 5 and are arranged in duplicate on those parts which connect together and normally maintain the tongues 3 in the danger position to prevent any damage incurred by the wires breaking. The wires 4 are further secured on diametrically opposite sides of a sheave 7, this sheave 7 being mounted on the signal-post 6 and serving to actuate the semaphore-arm 8. When the arm stands at "danger," the tongues 3 are simultaneously actuated through the medium of the wires or wire ropes 4, so that they are caused to approach toward the track-rails 1.

At the back end of the locomotive, underneath the same and opposite one another, two rollers 10 11 are mounted to move outwardly and so arranged that they cannot come into contact with the tongues 3 when these latter are in an opened position. Of these rollers, 10 serves for giving the electric and 11 for actuating the mechanical signal. The signal apparatus which is actuated by these rollers is fixed in the locomotive-cab, as shown in Figs. 10 to 13.

Both of the slide-rollers on the engine are mounted on arms 12 to oscillate outwardly on the under side of the framework in bearings 13. Springs 14 are provided, which serve to maintain the arms 12, with the rollers 10 11, in their position of rest. (See Fig. 9.) The arm 12 for the electrical indicator-roller 10 when it is moved outward by the contact-rail 2 3 comes up against a pin 16, mounted in a vulcanized rubber buffer-bearing 15, thereby completing an electric circuit 17, which by means of an electromagnet 18 releases a catch-lever 19 of a signal-flap 20, so that this latter through the intermediary of a spring or similarly-actuated spindle 21 opens and discloses a plate arranged behind it bearing, for example, the inscription "danger" or some other appropriate sign in color.

The arm 12 of the second roller 11, which serves to give the mechanical signal, is jointed at its top end to couple with a lever 23, mounted longitudinally on the under side of the engine, so that it can turn in a horizontal plane, this lever at its back end carrying a pin 24, which is in contact with the under tapered-off face 25 of a guide-piece 26, so that when the lever 23 is correspondingly oscillated—i. e., when the roller 11 and arm 12 are moved to one side by the contact-rails 2 3—the guide-piece 26 is raised. At the upper end of this latter a rod 27 is secured, which as it is raised also actuates a catch-lever 28 of a second signal-flap 29 on a spring-spindle 21, which thus discloses the same sign as the flap 20. The deflection of both shutters is limited by shoulders 30. Both flaps 20 29 are further connected to an electric circuit 31, Fig. 12, which is also coupled with the stops 30. As both or only one of the flaps fall down the circuit 31 is completed and the electric bell 32 set ringing.

The apparatus works as follows: If the signal-arm 8 is set at "danger," the sheave 7 turns in the direction indicated by the arrow in Fig. 1 and through the medium of the wires 4 causes the tongues 3 of the contact-rails 2 to approach toward the track-rails 1, so that both of the rollers 10 11 on the engine come into contact with them. The rollers 10 11 are thereby forced outward and slide along the outer face of the contact-rails 2. Through this outward oscillation, as has been before explained, the catches 19 28 of the flaps 20 29 are released on the one side electrically and on the other by mechanical means. The flaps fall down instantaneously and disclose the signal-signs they had been covering, the bell 32 being simultaneously set ringing. The engine driver thus knows without having even seen the semaphore that the line ahead is not clear. The bell goes on sounding until the flaps 20 29, which start it, are again closed. If the signal 8 is set to "safety" or "line clear," the tongues 3 are again moved away from the track-rails 1 and the rollers 10 11 glide unhindered between the track 1 and the contact-rails 2.

The apparatus can be operated when leaving as well as when arriving at a station. This may be accomplished by providing another pair of movable tongues which operate the signals when leaving the station, which signals may be placed beside the signals operating when arriving and are connected up in the same way. (See Fig. 14.) The construction shown in these latter figures contains at the same time the connection of the signal arrangement with the registering apparatus. The double flaps 20 29, which signalize the track-rails to be worked, are arranged one below the other and can be either colored correspondingly or marked with corresponding number or letter signals. Below these flaps 20 29 there is a hollow cylinder $32^a$, easily to be turned, which on its ends and, if desired, in the middle, too, is provided with pins or teeth 33. On this hollow cylinder $32^a$ an endless paper ribbon 34 hangs, which shows perforations 35 corresponding with the teeth, so that the ribbon is moved through the medium of the teeth 33 by turning of the cylinder. To keep this endless paper ribbon 34 always taut, a cylinder 36 is provided below the cylinder $32^a$ and slides in slits 37 on the side of the casing 38 and strains the paper ribbon with its weight.

The endless paper ribbons 34 are divided in transverse sections 39. Two of the sections arranged one after another are described with the name of one station, whereby the one section is marked for the semaphore V and the other for the safety-signal E of the corresponding station. The endless ribbon 34 therefore is provided, corresponding to the line to be worked, with the same number of double sections as there are stations. When the endless paper ribbon is in a state of rest, a section is always directly below the copying-pins 41, Fig. 14, which are arranged above the hollow cylinder 32ᵃ and kept normally in the lifted position by means of the spiral springs 40. The copying-pins, if the signal-flaps 20 29 fall down, are so actuated that they make a hole in the endless paper ribbon. The middle copying-pins are struck directly by the lower flaps 29 and mark the endless paper ribbon as the spiral springs 40 are compressed. After lifting of the flaps 29 the spiral springs remove the copying-pins to their lifted position. The upper flaps are provided on the side with lugs 42, which fall on copying-pins 45, conducted in guides 43 and held up by springs 44, and which work like the two inner copying-pins 41. To bring back the signal-flaps to the locked position, there are arranged shafts 47, actuated by a handle 46 and having bearings immediately below the flaps, which shafts are coupled movably one with another by means of a piece of leather 48. These shafts carry arms 49, extending under the flaps 20 29, which when the shafts are turned take along with them the flaps and bring them to the upper and locked position.

With the lower shaft 47 is coupled an eccentric 50, working with a pawl 51, which engages with a ratchet-wheel 52, connected with a shaft 53. This shaft carries toothed wheel 54, engaging with a toothed wheel 55 of equal dimensions, which is coupled with the shaft of the hollow cylinder 32ᵃ of the endless paper ribbon 34. A catch-pin 56, arranged on the ratchet-wheel 52, prevents a backward motion of the latter when the shaft 47 is turning—for example, when the fallen signal-flaps are being closed. If the eccentric sheave 50 is therefore moved, and consequently the ratchet-wheel 52 and the hollow cylinder 32ᵃ turned, the endless paper ribbon 34 is advanced one section, so that the section not yet marked arrives under the copying-pins 41. The division of the ratchet-wheel 52 is naturally such that it corresponds with the width of the sections 39. As the shafts 47, arranged under the flaps, should fall again down into their former position after the flaps are closed and their arms are again placed in a horizontal line, the upper of them is provided with a spiral-spring 57, one end of which is connected firmly with the shaft and the other end firmly with the bearing.

The described mechanisms are arranged inside a casing 38, which can be opened only by the controlling officers, but is inaccessible to the engine driver. The engine driver therefore can move the two shafts 47 only by means of the handle 46, extending out of the casing, if he will close again the signal-flaps 20 29, which have fallen.

By closing the signal-flaps the endless paper ribbon is advanced one section, as described before, so that the flaps if they fall again can mark the next section, and so on.

The contact-rails 2 are arranged as close as possible to the track-rails 1, nearly in the same plane as the locomotive-wheels, and the slide-rollers 10 11 are so attached to the engine-frame that they are situated behind the wheel-guards of the same, so that during snowstorms, &c., these guards can first clear the contact-rails from snow and make a path for the rollers 10 11, thus preventing the actuation of the signal apparatus being interfered with. For this reason, chiefly, two contact-rails lying in one direction are mounted at the side of the track in order to insure that there be no breakdown of the signaling device on account of the side swing of the engine. This arrangement insures one of the contact-rails always performing its work in spite of such oscillations. Consequently this swinging of the engine in no way affects the action of the signaling device, because the slide-rollers on the locomotive can bend in a side direction and can glide freely outside the contact-rails and are there capable of "giving" to the oscillations in all directions. If now the contact-rails are arranged at equal distances from each side of the track-rails, the apparatus can only be used for double lines. In order to be able to use it for single lines also, the contact-rails must be arranged at different distances from the track-rails 1 in order that the slide-rollers on the engine should only come into contact with the former when running into, not out of, a station, for example.

To avoid the use of contact-rails situated at unequal distances from the track-rails and to arrange that the locomotive when running in the direction in which a working of the engine-signals is not wished and not necessary—for example, when running out of a station—can pass the section-stop unhindered, the latter being normally in the closed position, without effecting a side motion of the contact-rollers, the following device is provided, which is shown as an example in the Figs. 3 to 7.

A notch 60 is provided in the tongues 3 of the contact-rails 2, which is kept closed by means of an iron plate 63, pivoted at 61 and maintained normally in a raised position by springs 62. To prevent this plate springing up too far, it is furnished with a slot 64, through which a screw 65 projects. On the back face of the iron plate 63 is an inclined-plane guide 66, which causes the slide-roller on the engine to run upon the contact-rails gradually and without shock.

If a train is leaving a station and the tongues 3 of the contact-rails 2 are in the danger position, the rollers 10 11 of the engine press the slide 66, and consequently the iron plates 63, downward and pass through the notches 60 of the tongues 3, which are thereby opened, Figs. 5 to 7. The rollers 10 11 do not in this case move sidewise, and therefore the signal is not actuated. When running in the opposite direction, the rollers 10 11 glide, as described before, in the ordinary way along the outer face of the contact-rails 2 and along the iron plates 63, whose outer faces are flush with the outer face of tongues 3.

The iron plate 63 works as a switch. In the one case the iron plate remains in its position and the slide-roller on the engine is moved aside, while in the other case the slide-roller remains in its position and the iron plate of the track-rail is moved out of its position.

Having thus described my invention, what I claim as new therein, and desire to secure by Letters Patent, is—

1. Signaling apparatus for a locomotive or vehicle on a fixed track comprising guide-rails on both sides of said track, movable tongues for said rails, signal-controlling devices on the locomotive or vehicle, and means for enabling the controlling devices to pass the said tongues when in an operative position without being operated thereby in one direction of motion and for deflecting the same in the opposite direction of motion, substantially as set forth.

2. A signaling apparatus for locomotives, the combination with the tongues movable laterally or transversely of the track toward and from the same, of controlling devices carried by the moving vehicle, said tongues having an engaging face which, when in an operative position, operates the signal-controlling devices in one direction of movement of the vehicle and yields to not operate said devices in the other direction of movement of the vehicle.

3. In a signal apparatus for locomotives or vehicles which run on a fixed track, the combination of a signal-controlling device carried by the locomotive or vehicle, a guide-rail for the controlling device mounted to one side of the track, and having a movable tongue provided with a passage-way for the controlling device, a gate adapted to close said passage-way, and to be moved out of the path of the controlling device by contact therewith.

4. Signaling apparatus for a locomotive or vehicle on a fixed track comprising guide-rails parallel with each side of the track, movable tongues thereon having suitable openings or gates, closing pieces or plates for said openings or gates and signal-controlling devices carried by the locomotive or vehicle adapted to be deflected by said tongues in one direction of motion of the locomotive or vehicle and to operate the said movable gates or plates in the opposite direction of motion, substantially as set forth.

5. Signaling apparatus for a locomotive or vehicle on a fixed track comprising guide-rails parallel with the track, movable tongues thereon having suitable openings or gates and movable plates for closing said gates, spring-held to normal closed position, inclined ways upon said plates, and signal-operating devices on the locomotive or vehicle adapted to ride on said inclined ways and depress the said plates, substantially as set forth.

6. In a signaling device for locomotives, the combination with the signal carried by the locomotive and operated when the car passes a certain point, of a recording device, means for recording on the recording device when the signal is operated, and means for simultaneously restoring the signal and for moving the recording device to another position.

7. In a signaling device, the combination of a visible signal, an electric circuit including electromagnetic devices for operating the said visible signal, recording means controlled by the operation of said visible signal, and including a record-strip and means for restoring said visible signal to normal having operative connection with such record-strip.

8. In a signaling device, the combination of a visible signal, a recording device controlled by the operation of such visible signal and including a record-strip and marking devices therefor, feeding devices for said record-strip, and means for restoring said visible signal to normal having operative connection with such feeding devices.

9. In a signaling device, the combination of visible signal-flaps, a record strip-carrying cylinder, marking-pins adapted to be operated by the dropping of said flaps, a record-strip on said cylinder composed of sections fastened together, step-by-step feeding mechanism for said strip, and a handle and shaft for restoring the signal flaps to normal position and connected to such step-by-step feed mechanism, substantially as set forth.

HERMANN STADELMANN, JR.

Witnesses:
PAUL TEICHMANN,
HERMANN STADELMANN, Sr.